United States Patent
Hung et al.

(10) Patent No.: US 8,705,662 B2
(45) Date of Patent: Apr. 22, 2014

(54) SOFT DECISION METHOD AND ASSOCIATED SIGNAL RECEIVING SYSTEM

(75) Inventors: Shao-Ping Hung, Hsinchu Hsien (TW); Ching-Hsiang Chuang, Hsinchu Hsien (TW); Tien-Hsin Ho, Hsinchu Hsien (TW)

(73) Assignee: MStar Semiconductor, Inc., Taiwan (TW)

( * ) Notice: Subject to any disclaimer, the term of this patent is extended or adjusted under 35 U.S.C. 154(b) by 797 days.

(21) Appl. No.: 12/910,108

(22) Filed: Oct. 22, 2010

(65) Prior Publication Data
US 2011/0103522 A1    May 5, 2011

(30) Foreign Application Priority Data
Oct. 30, 2009  (TW) ............................... 98136961 A

(51) Int. Cl.
  *H03D 3/00* (2006.01)
(52) U.S. Cl.
  USPC ........................................................ 375/322
(58) Field of Classification Search
  USPC .......... 375/262, 267, 322, 332, 340, 341, 347
  See application file for complete search history.

(56) References Cited

U.S. PATENT DOCUMENTS

| | | | | |
|---|---|---|---|---|
| 6,977,972 | B1* | 12/2005 | Kandala et al. | 375/332 |
| 2003/0138054 | A1* | 7/2003 | Ha et al. | 375/261 |
| 2005/0111563 | A1* | 5/2005 | Tseng | 375/261 |

* cited by examiner

*Primary Examiner* — Sam K Ahn
*Assistant Examiner* — Syed Haider
(74) *Attorney, Agent, or Firm* — Han IP Corporation

(57) ABSTRACT

A soft decision method for determining a soft decision coordinate associated with a constellation is provided. The soft decision coordinate includes a first soft decision sub-coordinate and a second soft decision sub-coordinate. The method includes receiving an input signal including a coordinate value; defining a first coordinate range on a coordinate axis in the constellation, the first coordinate range having a first limit and a second limit; obtaining the first soft decision sub-coordinate according to the first coordinate range; defining a second coordinate range on the coordinate axis in the constellation, the second coordinate range having a third limit and a fourth limit; and obtaining the second soft decision sub-coordinate according to the second coordinate range; wherein the first and the third limit do not simultaneously equal to the second and the fourth limit.

10 Claims, 11 Drawing Sheets

SOFT DECISION METHOD AND ASSOCIATED SIGNAL RECEIVING SYSTEM

CROSS REFERENCE TO RELATED PATENT APPLICATIONS

This patent application claims priority from Taiwan Patent Application No. 098136961, filed in the Taiwan Patent Office on Oct. 30, 2009, entitled "Soft Decision Method and Associated Signal Receiving System", and incorporates the Taiwan patent application in its entirety by reference.

TECHNICAL FIELD

The present disclosure relates to a data processing method in a communication system, and more particularly to a soft decision demapping method in a communication system.

BACKGROUND OF THE PRESENT DISCLOSURE

FIG. 1 is a block diagram of a conventional signal receiving system 10. The signal receiving system 10 comprises a signal retriever 140, a demapper 160 and a decoder 180. The demapper 160 comprises a mapping function mapping apparatus 164 and a quantizer 167.

The signal retriever 140 receives an input signal and transforms a time-domain input signal to two corresponding signals namely a frequency-domain inphase signal (I signal) and quadrature signal (Q signal). The demapper 160 generates the digital data corresponding to I and Q signals according to constellations applied to the input signal. For example, the constellations applied to the modulation, such as binary phase shift keying (BPSK), 16 quadrature amplitude modulation (16QAM) and 64QAM, are different, so the I and Q signals corresponding to the digital data are different. Lastly, the decoder 180 transforms the digital data to an output data.

Theoretically, the I and Q signals generated by the signal receiving system 10 should map correctly on the constellations to two integers of a Gray code, which is a coding method and is a set of a sequence. Each number of the Gray code is represented by binary, and there is only one different bit between any two of Gray code. However, the signal processed by the signal receiving system 10 may be interfered by the noise such that the I and Q signal generated by the signal retriever 140 may not be an integer, i.e., the I and Q signal may not map exactly to the Gray code on the constellation, such that one needs other methods for mapping the non-integer I and Q signals to the Gray code.

One of the solutions to solve the above problem is a soft decision method. FIG. 2 is a conventional 64QAM constellation, wherein the I-axis represents the I signal, and the Q-axis represents the Q signal. Each point on the constellation maps to a 6-bit value (0 to $2^6-1$), of which the first three bits represent the I part, and the last three bits represent the Q part. If the signal receiving system 10 uses the 64QAM, the soft decision method is to map the coordinates (I, Q) of the I and Q signals received by the demapper 160 to a soft coordinate ($I_0$, $I_1$, $I_2$, $Q_0$, $Q_1$, $Q_2$). For example, the I coordinate of 5.3 maps to ($I_0^*$, $I_1^*$, $I_2^*$)=(5.3, −1.3, 0.7) by the mapping function mapping apparatus 164. The corresponding mapping function is as follows:

$$\begin{cases} I_0^* = I \\ I_1^* = -|I| + 4 \\ I_2^* = -||I| - 4| + 2 \end{cases}$$

Limited by the memory in the hardware, practically, one needs to quantize a decimal to a value acceptable to the hardware. Therefore, ($I_0^*$, $I_1^*$, $I_2^*$)=(5.3, −1.3, 0.7) is quantized to ($I_0$, $I_1$, $I_2$)=(3, −2, 2) as shown in FIG. 2 by quantizer 167, where ($I_0$, $I_1$, $I_2$)=(3, −2, 2) is very different to the original ($I_0^*$, $I_1^*$, $I_2^*$)=(5.3, −1.3, 0.7). The conventional soft decision method is to divide $I_0$, $I_1$ and $I_2$ on the constellation into N equal parts (N=8 in FIG. 2) without taking the distinct ranges of $I_0$, $I_1$ and $I_2$ into consideration. That is, when $I_0$ is determined as being positive or negative, the total range of $I_1$ is only a half of the total range of $I_0$, i.e., the total range of $I_1$ is only the positive region or the negative region of $I_0$. Similarly, when $I_1$ is determined as being positive or negative, the total range of $I_2$ is only a half of the total range of $I_1$. More specifically, respective absolute distances from $I_0$=4 and $I_1$=4 to the origin are not identical. In fact, from FIG. 2, the distance between origin and $I_1$=4 is a half of the absolute distance between origin and $I_0$=4. Hence, dividing all $I_0$, $I_1$ and $I_2$ into N equal parts causes quantizing distortion to undesirably affect the determination of the decoder, such that not only the coding gain is reduced but also the bit error rate (BER) is increased from being unable to accurately correct erroneous bits. Therefore, it is urgently needed a better soft decision method and associated signal receiving system to increase the coding gain and to reduce the bit error rate.

SUMMARY OF THE PRESENT DISCLOSURE

It is one of the objectives of the present disclosure to provide a soft decision method and associated signal receiving system to increase the coding gain and to reduce the bit error rate for data processing of a communication system.

The present disclosure provides a soft decision method for determining a soft decision coordinate associated with a constellation, the soft decision coordinate comprising a first soft decision sub-coordinate and a second soft decision sub-coordinate. The soft decision method comprises receiving an input signal comprising a coordinate value; defining a first coordinate range on a coordinate axis in the constellation, and the first coordinate range having a first limit and a second limit; obtaining the first soft decision sub-coordinate according to the first coordinate range; defining a second coordinate range on the coordinate axis in the constellation, and the second coordinate range having a third limit and a fourth limit; and obtaining the second soft decision sub-coordinate according to the second coordinate range; wherein the first limit and the third limit and the second limit and the fourth limit are not equal simultaneously.

The present disclosure further provides a soft decision method for determining a soft decision coordinate associated with a constellation, the soft decision coordinate comprising a first soft decision sub-coordinate and a second soft decision sub-coordinate. The soft decision method comprises receiving an input signal comprising a coordinate value; defining a first coordinate range on a coordinate axis in the constellation, such that the first coordinate range has a plurality of equal first intervals; obtaining the first soft decision sub-coordinate according to the first intervals; defining a second coordinate range according to a portion of the first intervals, such that the second coordinate range has a plurality of equal second intervals; and obtaining the second soft decision sub-coordinate according to the second intervals; wherein a size of the first interval and a size of the second interval are substantially equal.

The present disclosure further provides a signal receiving system comprising: a signal retriever, for receiving an input signal and for transforming the input signal to a coordinate value; a demapper, coupled to the signal retriever, for demapping the coordinate value to a soft decision coordinate, the soft decision coordinate comprising a first soft decision sub-coordinate and a second soft decision sub-coordinate, the first soft decision sub-coordinate having a first limit and a second limit, and the second soft decision sub-coordinate having a third limit and a fourth limit, wherein the first and limit the third limit and the second limit and the fourth limit are not equal simultaneously; and a decoder, coupled to the demapper, for decoding the soft decision coordinate to output an output data.

The soft decision method and associated signal receiving system provided by the present disclosure can minimize the misjudgment of the signal receiving system on noise-interfered signal to increase the coding gain and to reduce the bit error rate.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF THE PREFERRED EMBODIMENT

Figure 1:
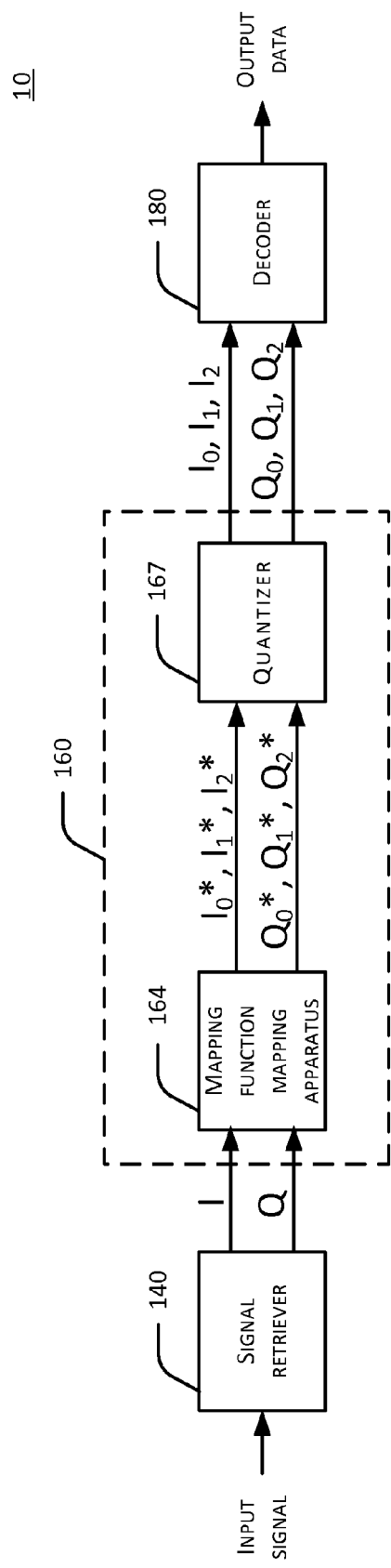
FIG. 1 is a block diagram of a conventional signal receiving system.
Figure 2:
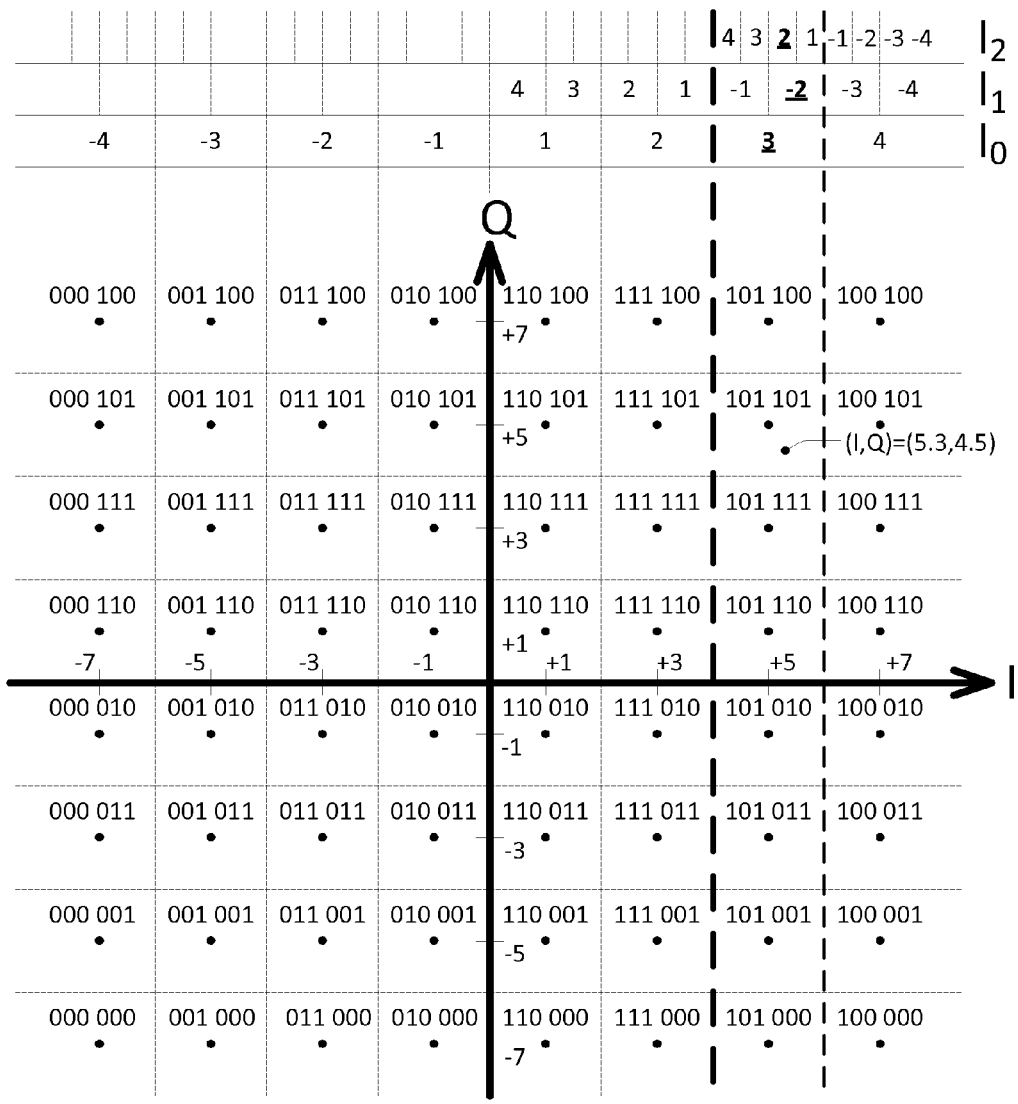
FIG. 2 is a conventional 64QAM constellation.
Figure 3:
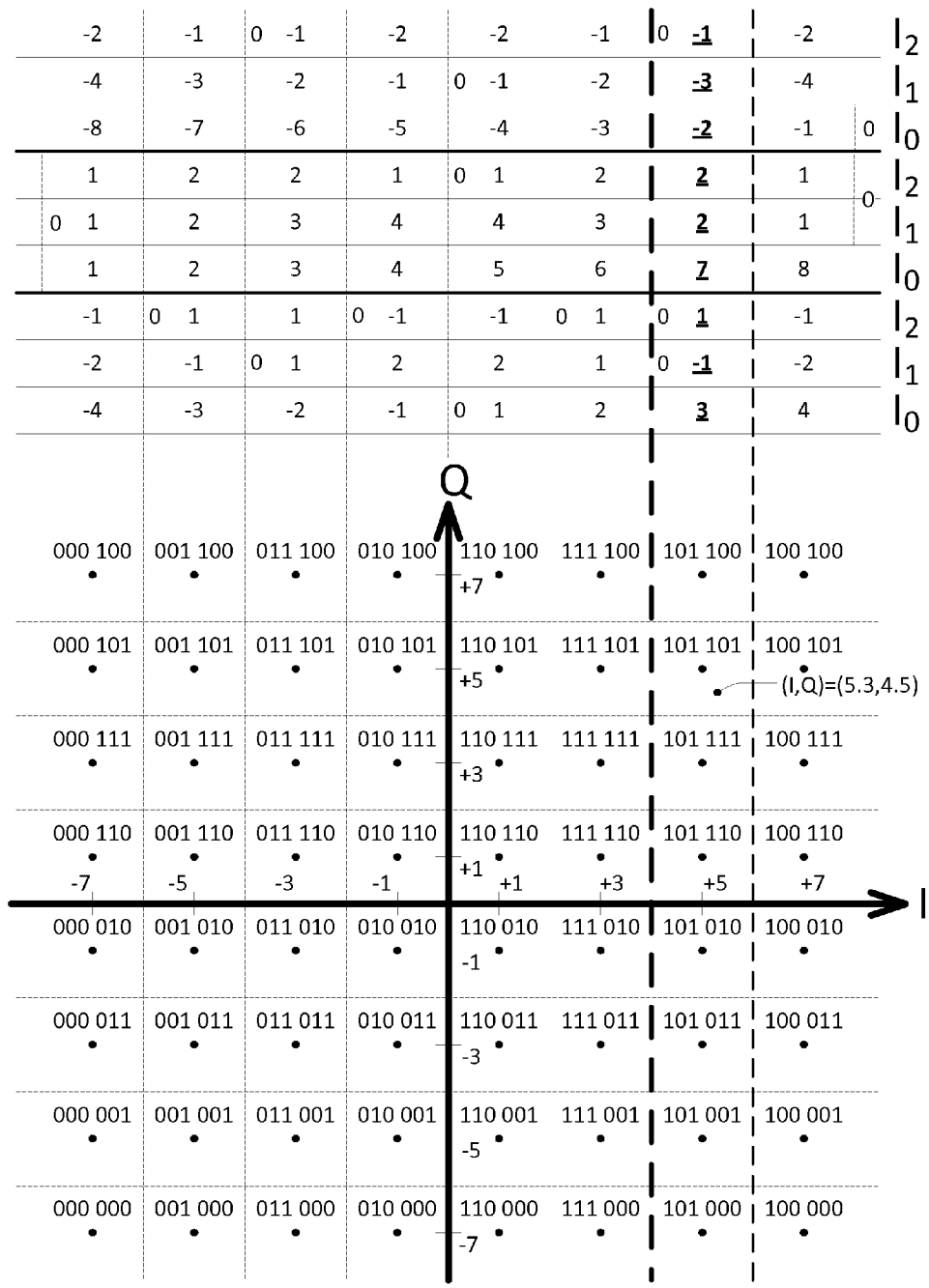
FIG. 3 is a 64QAM constellation according to one embodiment of the present disclosure.
Figure 4:
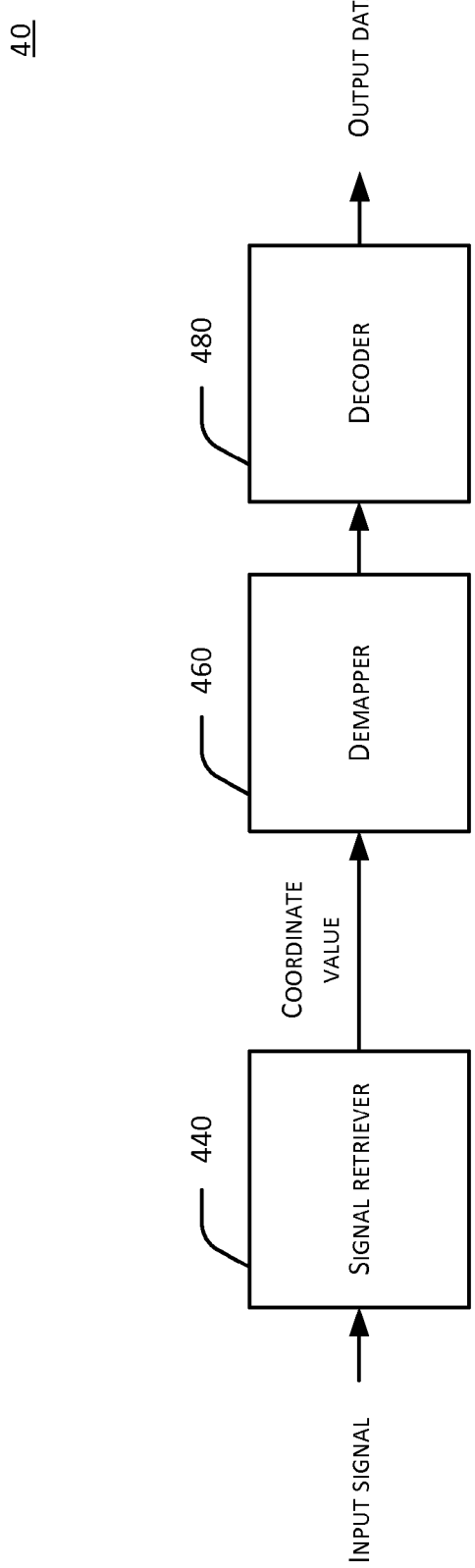
FIG. 4 is a block diagram of a signal receiving system according to one embodiment of the present disclosure.

FIG. 3 is a 64QAM constellation according to one embodiment of the present disclosure. FIG. 4 is a block diagram of a signal receiving system 40 according to one embodiment of the present disclosure. The signal receiving system 40 comprises a signal retriever 440, a demapper 460 and a decoder 480. The signal retriever 440 receives an input signal and converts the input signal to a complex signal 5.3+4.5j. The complex signal signifies a coordinate value representing a coordinate (5.3, 4.5) on the constellation in FIG. 3, where 5.3 is the I coordinate value, and 4.5 is the Q coordinate value.

The demapper 460, coupled to the signal retriever 440, demaps I coordinate value and Q coordinate value to the coordinate ($I_0, I_1, I_2, Q_0, Q_1, Q_2$), wherein $I_0, I_1, I_2, Q_0, Q_1$ and $Q_2$ all can have limits. In a preferred embodiment, since the signal received by signal retriever 440 is noise-interfered, the amplitude of the input signal may be large, resulting in a large coordinate value. Therefore, to prevent the large coordinate value from affecting calculation results and to reduce hardware costs, the coordinate is limited within a predetermined range by a clipper. For example, FIG. 3 shows the predetermined range is set from −8 to 8. Any coordinate value greater than 8 is regarded as 8, and any coordinate value smaller than −8 is regarded as −8. For example, a coordinate value of 9.8 is regarded as 8.

In the embodiment, the I-axis is defined as having 8 equal intervals on the constellation in FIG. 3, numbered from −4 to 4. That is, the range of the $I_0$ coordinate is from −4 to 4, with −4 and 4 being the limits of the $I_0$ coordinate. When the range of the $I_0$ coordinate is set from 0 to 8, the limits of the $I_0$ coordinate are then 0 and 8. Similarly, the range can be set from −8 to 0, and −8 and 0 are accordingly the limits of the $I_0$ coordinate. The above coordinate range can be user-defined based on performance requirements and the hardware costs. As the greater coordinate range is defined, the lower the bit error rate is achieved however with more hardware costs.

Since the I-axis is defined into 8 equal parts by the $I_0$ coordinate, to reflect the importance of the absolute value of the $I_0$ coordinate and the absolute value of the $I_1$ coordinate, the $I_1$ coordinate defines the positive part of the $I_0$ coordinate into four equal intervals numbered from 1 to 4, respectively. Similarly, $I_1$ coordinate defines 4 the negative part of the $I_0$ coordinate into four intervals numbered from −1 to −4, respectively. Hence, the interval length of the $I_0$ coordinate and the interval length of $I_1$ coordinate are equal. That is, total range of four parts of $I_1$ coordinate is a half of total range of the $I_0$ coordinate, i.e., −4 to −1 and 4 to 1 of $I_0$ coordinate both map to −2 to 2 of the $I_1$ coordinate. Therefore, the limits of the $I_1$ coordinate are −2 and 2. Similarly, the limits can be 0 and 4 or −4 and 0. From the above, two limits of the $I_0$ coordinate and the two limits of the $I_1$ coordinate are not identical simultaneously.

The decoder 480, coupled to the demapper 460, decodes the coordinate ($I_0, I_1, I_2, Q_0, Q_1, Q_2$) to output an output data. In a preferred embodiment, the decoder can be Viterbi decoder.

Figure 5:
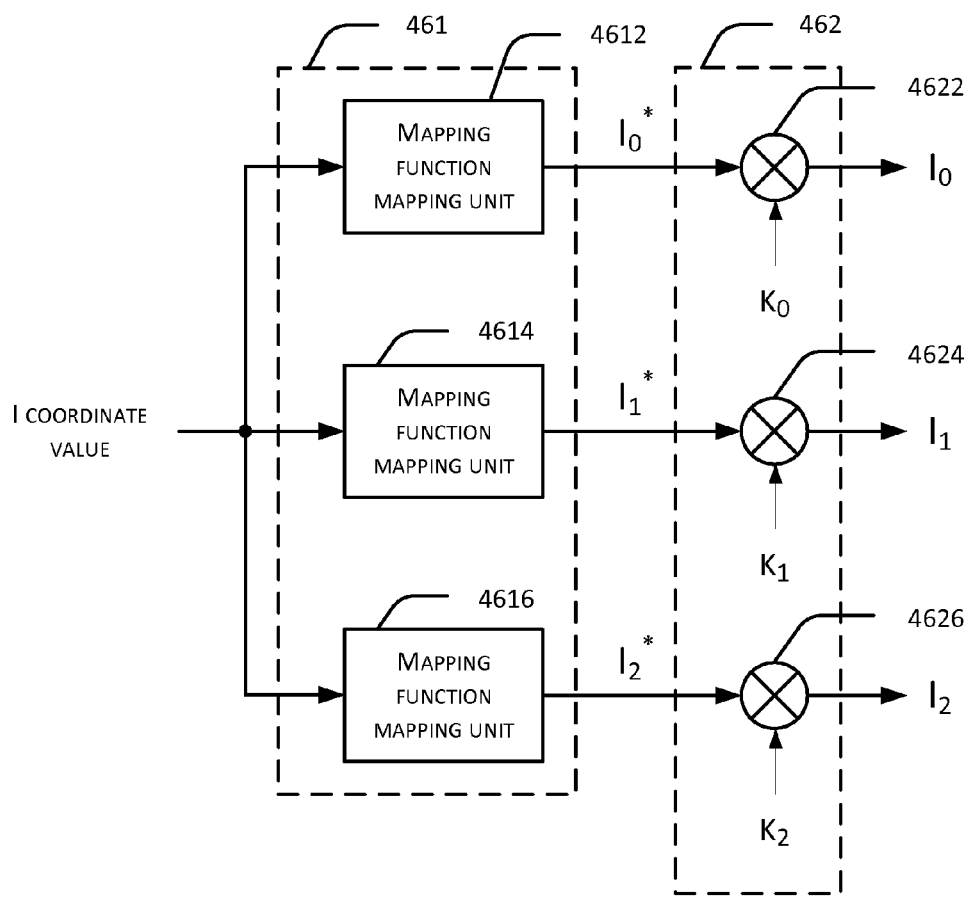
FIG. 5 is a block diagram of the demapper 460 according to one embodiment of the present disclosure.
Figure 6:
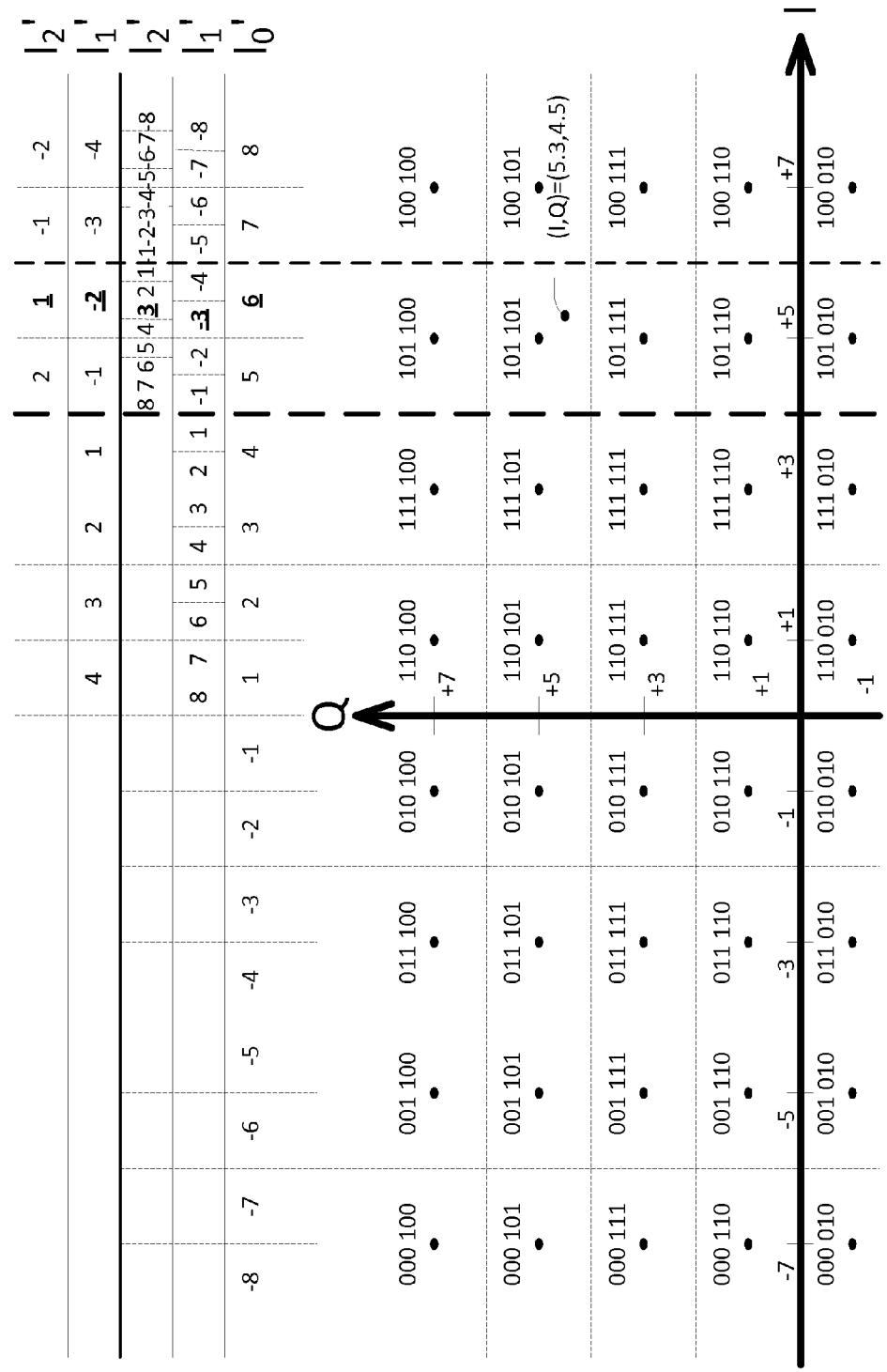
FIG. 6 is a 64QAM constellation according to one embodiment of the present disclosure.

FIG. 5 is a block diagram of the demapper 460 according to one embodiment of the present disclosure. The demapper 460 comprises a mapping function mapping apparatus 461 and a multiplier 462. The mapping function mapping apparatus 461 is coupled to the signal retriever 440 and comprises mapping function mapping units 4612, 4614 and 4616. The mapping function mapping units 4612, 4614 and 4616 comprises a quantizing unit (not shown) respectively. The I coordinate is taken as an example in the description below, whereas the Q coordinate have similar principles as the I coordinate. FIG. 6 is a 64QAM constellation according to one embodiment of the present disclosure. The mapping function mapping units 4612, 4614 and 4616 receive an I coordinate value and map the I coordinate value to $I_0^*$ coordinate, $I_1^*$ coordinate and $I_2^*$ coordinate according to the following mapping function, respectively:

$$\begin{cases} I_0^* = I \\ I_1^* = -|I| + 4 \\ I_2^* = -||I| - 4| + 2 \end{cases}$$

For example, the coordinate value I=5.3 maps to another coordinate ($I_0^*, I_1^*, I_2^*$)=(5.3, −1.3, 0.7). The quantizers in the mapping function mapping units 4612, 4616 and 4616 define the I-axis into the $I_0'$, $I_1'$ and $I_2'$ coordinates respectively having a length of 1, ½ and ¼ according to a first step, a second step and a third step. Then, $(I_0^*, I_1^*, I_2^*)=(5.3, -1.3, 0.7)$ is quantized to 6 as the $I_0'$ coordinate, $-3$ as the $I_1'$ coordinate and 3 as the $I_2'$ coordinate by the quantizers. In the embodiment, the first, second and third steps are 1, ½ and ¼ respectively.

The multiplier 462, coupled to the mapping function mapping apparatus 461, comprises multiplying units 4622, 4624 and 4626 for multiplying a first coefficient, a second coefficient and a third coefficient (i.e. $k_0$, $k_1$ and $k_2$) by the $I_0'$ coordinate, the $I_1'$ coordinate and the $I_2'$ coordinate respectively to obtain the $I_0$ coordinate, the $I_1$ coordinate and the $I_2$ coordinate. For example, $k_0$, $k_1$ and $k_2$ are set to ½, ¼ and ⅛ respectively. The $I_0'$ coordinate (6), the $I_1'$ coordinate ($-3$) and the $I_2'$ coordinate (3) are multiplied by $k_0$, $k_1$ and $k_2$ respectively and quantized (such as unconditionally carried) to obtain 3, $-1$ and 1 as the $I_0$, $I_1$ and $I_2$ coordinates, respectively.

In another preferred embodiment, FIG. 6 shows the first, second and third steps are all set to 1, i.e., the unit lengths of the $I_0'$, $I_1'$ and $I_2'$ coordinates on the I-axis are all defined as 1. Then $(I_0^*, I_1^*, I_2^*)=(5.3, -1.3, 0.7)$ is quantized to 6 as the $I_0'$ coordinate, $-2$ as the $I_1'$ coordinate and 1 as the $I_2'$ coordinate by the quantizer. $k_0$, $k_1$ and $k_2$ are all set to ½. The $I_0'$ coordinate (6), the $I_1'$ coordinate ($-2$) and the $I_2'$ coordinate (1) are multiplied by $k_0$, $k_1$ and $k_2$ respectively and quantized to obtain 3, $-1$ and 1 as the $I_0$, $I_1$ and $I_2$ coordinates, respectively. From the above, it is concluded that the same results are achieved regardless that the first, second and third steps are equal, or the first, second and third coefficients are different.

Figure 7:
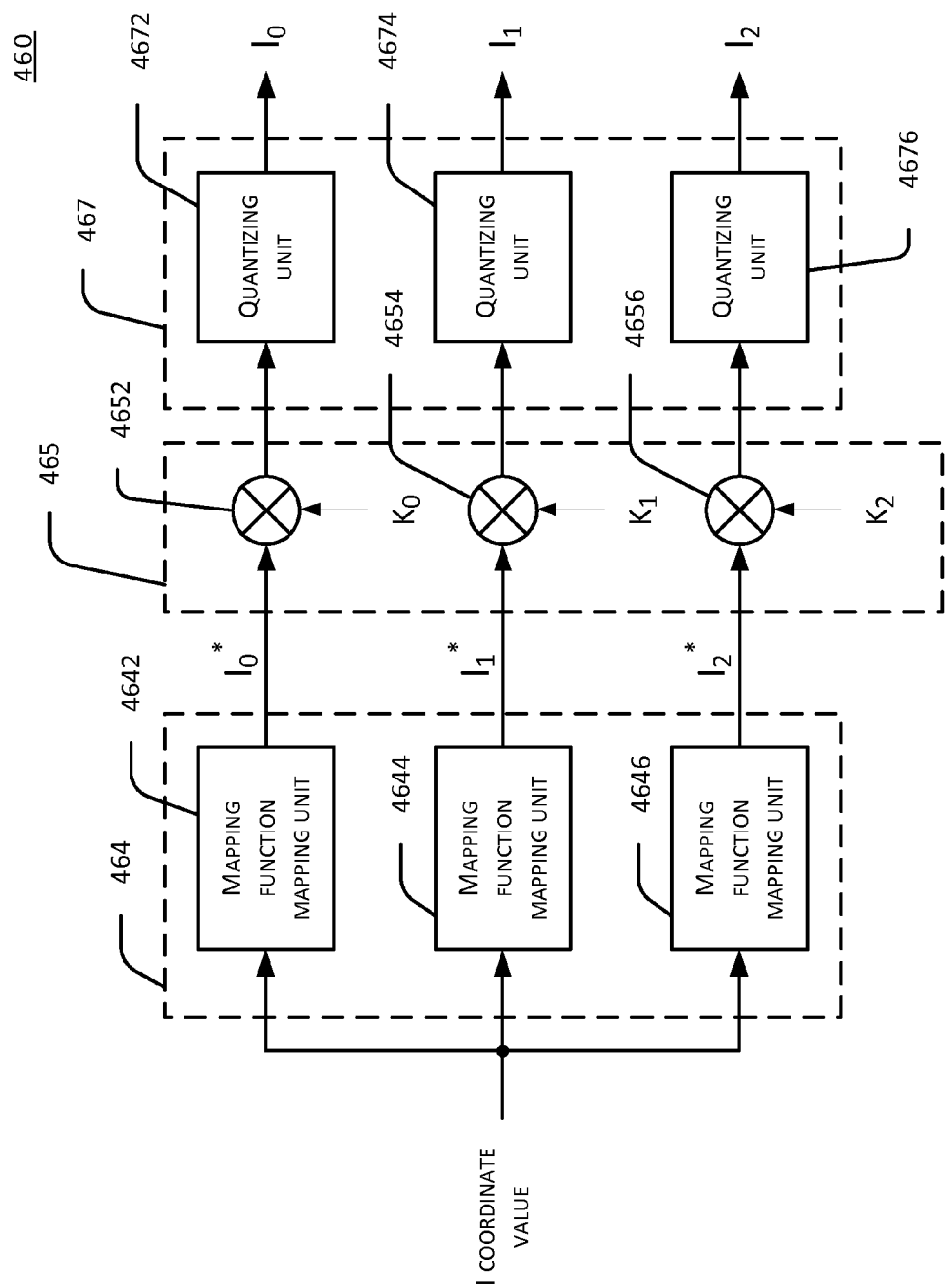
FIG. 7 is a block diagram of the demapper 460 according to another embodiment of the present disclosure.

FIG. 7 is a block diagram of the demapper 460 according to another embodiment of the present disclosure. The demapper 460 comprises a mapping function mapping apparatus 464, a multiplier 465 and a quantizer 467. The mapping function mapping apparatus 464, coupled to the signal retriever 440, comprises mapping function mapping units 4642, 4644 and 4646. The mapping function mapping units 4642, 4644 and 4646 receive an I coordinate value and map the I coordinate to an $I_0^*$ coordinate, an $I_1^*$ coordinate and an $I_2^*$ coordinate respectively according to a mapping function.

For example, $I=5.3$. The mapping function mapping units 4642, 4644 and 4646 map according to the following function:

$$\begin{cases} I_0^* = I \\ I_1^* = -|I| + 4 \\ I_2^* = -||I| - 4| + 2 \end{cases}$$

The coordinate value $I=5.3$ is mapped to $I_0^*=5.3$, $I_1^*=-1.3$ and $I_2^*=0.7$ respectively.

The multiplier 465, coupled to the mapping function mapping apparatus 464, comprises multiplying units 4652, 4654 and 4656. The multiplying units 4652, 4654 and 4656 multiply the first coefficient, the second coefficient and the third coefficient (i.e. $k_0$, $k_1$ and $k_2$) by the $I_0^*$ coordinate, the $I_1^*$ coordinate and the $I_2^*$ coordinate respectively to obtain an $I_0'$ coordinate, an $I_1'$ coordinate and an $I_2'$ coordinate. For example, when $k_0$, $k_1$ and $k_2$ are all set to 1, the $I_0'$, $I_1'$ and $I_2'$ coordinates are also 5.3, $-1.3$ and 0.7 respectively.

The quantizer 467, coupled to the multiplier 465, comprises quantizing units 4672, 4674 and 4676. The quantizing units 4672, 4674 and 4676 respectively quantize the $I_0'$, $I_1'$ and $I_2'$ coordinates to $I_0$, $I_1$ and $I_2$ coordinates according to the first, second and third steps. For example, FIG. 3 shows the first, second and third steps are all set to 2, i.e., I-axis is defined to 8 equal parts with an interval length of 2. 3, $-1$ and 1 as the $I_0$, $I_1$ and $I_2$ coordinates can be obtained respectively after quantizing by the quantizer 467.

Figure 8:
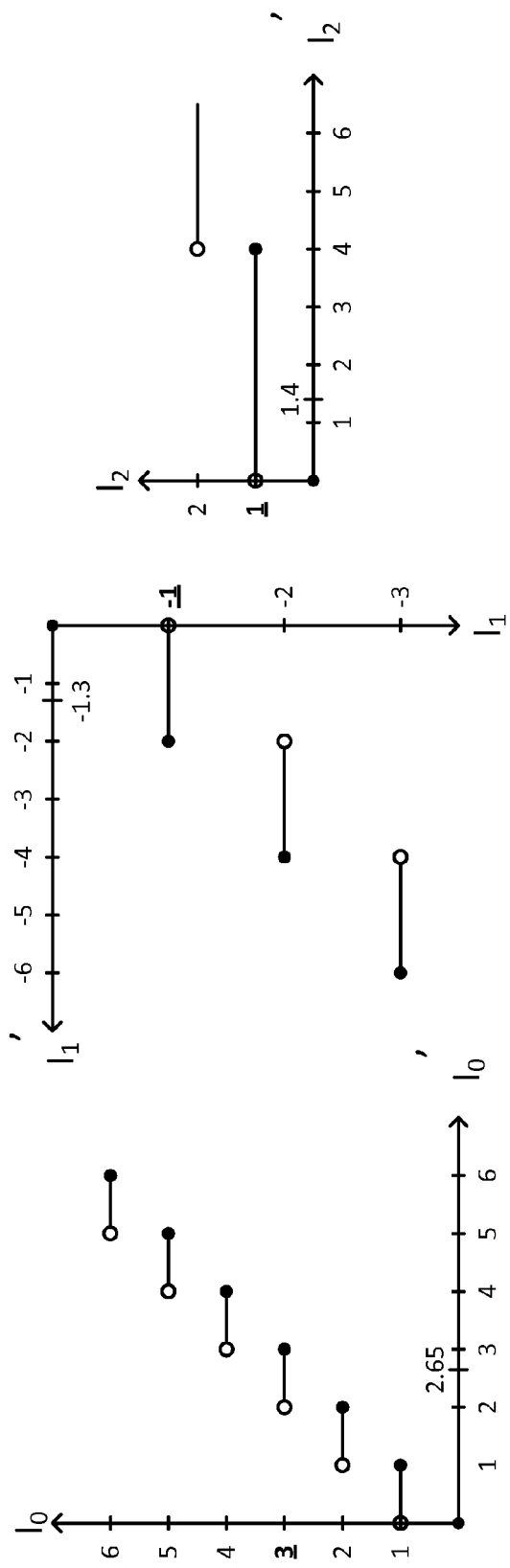
FIG. 8 is a quantizing function according to one embodiment of the present disclosure.

FIG. 8 is a quantizing function according to one embodiment of the present disclosure. In another preferred embodiment, FIG. 8 shows $k_0$, $k_1$ and $k_2$ are set to ½, 1 and 2 respectively. An $I_0^*$ coordinate (5.3), an $I_1^*$ coordinate ($-1.3$) and an $I_2^*$ coordinate (0.7) are multiplied by $k_0$, $k_1$ and $k_2$ respectively to obtain 2.65, $-1.3$ and 1.4 as $I_0'$, $I_1'$ and an $I_2'$ coordinate, respectively. The first, second and third steps are set to be 1, 2 and 4, that is, the quantizing steps are set to be 1, 2 and 4. After quantizing by the quantizer 467, 3, $-1$ and 1 are obtained as the $I_0$, $I_1$ and $I_2$ coordinates, respectively. From the above, it is concluded that the same results are achieved regardless that the first, second and third steps are equal, or the first, second and third coefficients are different.

Figure 9:
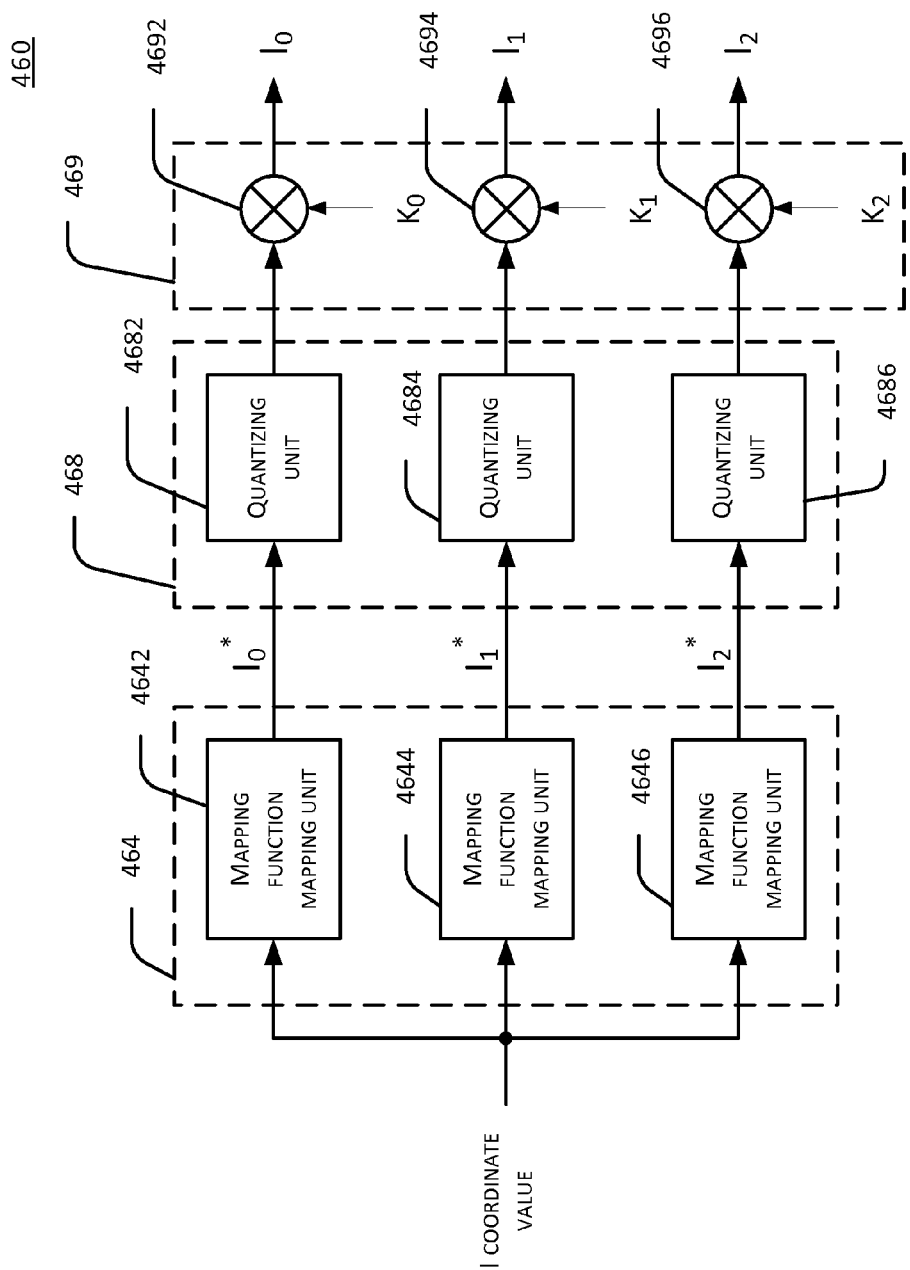
FIG. 9 is a block diagram of the demapper 460 according to another embodiment of the present disclosure.

FIG. 9 is a block diagram of the demapper 460 according to another embodiment of the present disclosure. The demapper 460 comprises the mapping function mapping apparatus 464, a quantizer 468 and a multiplier 469. The embodiment is similar to the embodiment in FIG. 7. A main difference is that positions of the quantizer 468 and the multiplier 469 are swapped with those of the multiplier 465 and the quantizer 467 in FIG. 7. However, operation details are similar and shall not be repeated for brevity.

Figure 10:
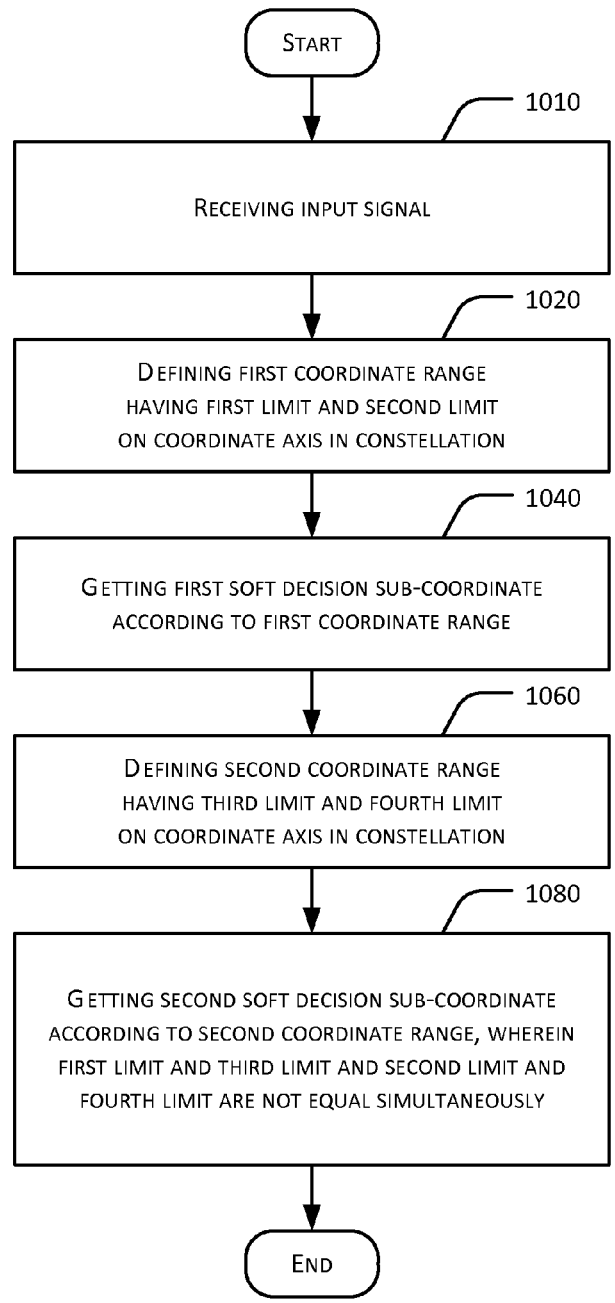
FIG. 10 is a flowchart of soft decision method according to one embodiment of the present disclosure.

FIG. 10 is a flowchart of soft decision method according to one embodiment of the present disclosure. In Step 1010, an input signal is received. In Step 1020, a first coordinate range having a first limit and a second limit is defined on a coordinate axis in a constellation. In Step 1040, a first soft decision sub-coordinate (such as $I_0$) is obtained according to the first coordinate range. In Step 1060, a second coordinate range having a third limit and a fourth limit is defined on the coordinate axis in the constellation. In Step 1080, a second soft decision sub-coordinate (such as $I_1$) is obtained according to the second coordinate range. Further, the first limit and the third limit and the second limit and the fourth limit are not equal simultaneously.

The embodiment can be applied to BPSK, QPSK or 16QAM. In an application to 64QAM, the above steps can be repeated. For example, referring to FIG. 3, for the coordinate value $I=5.3$, one can obtain $I_2=1$ from FIG. 3.

In a preferred embodiment, the input signal can have coordinate limits. Since the received signal is noise-interfered, the amplitude of the input signal may be large. Therefore, to prevent undesired effects on the calculation results and to reduce the hardware costs, the coordinate range is limited to a fifth limit and a sixth limit. For example, the fifth limit and the sixth limit are set to $-8$ and 8 respectively. Any coordinate value greater than 8 is regarded as 8, and any coordinate value smaller than $-8$ is regarded as $-8$. For example, a coordinate value of 9.8 is regarded as 8.

From the above, in FIG. 3, the range of the I coordinate value can be viewed as from $-8$ (the fifth limit) to 8 (the sixth limit). FIG. 3 shows the I-axis is defined to have 8 equal intervals numbered from $-4$ to 4. That is, the range of the $I_0$ coordinate is from $-4$ to 4, which are the limits of the $I_0$ coordinate. Hence, the first coefficient (such as $k_0$) is ½ or $-½$ and can be obtained by dividing 4 by 8 or dividing $-4$ by 8. That is, the first limit and the second limit are obtained by multiplying the fifth limit and the sixth limit by the first coefficient respectively. Similarly, the third limit ($-2$) and the fourth limit (2) of the $I_1$ coordinate are obtained by multiplying the fifth limit and the sixth limit by the second coefficient ($2/8=1/4$, such as $k_1$) respectively. It is concluded from the above that the second coefficient is not equal to the first coefficient.

Figure 11:
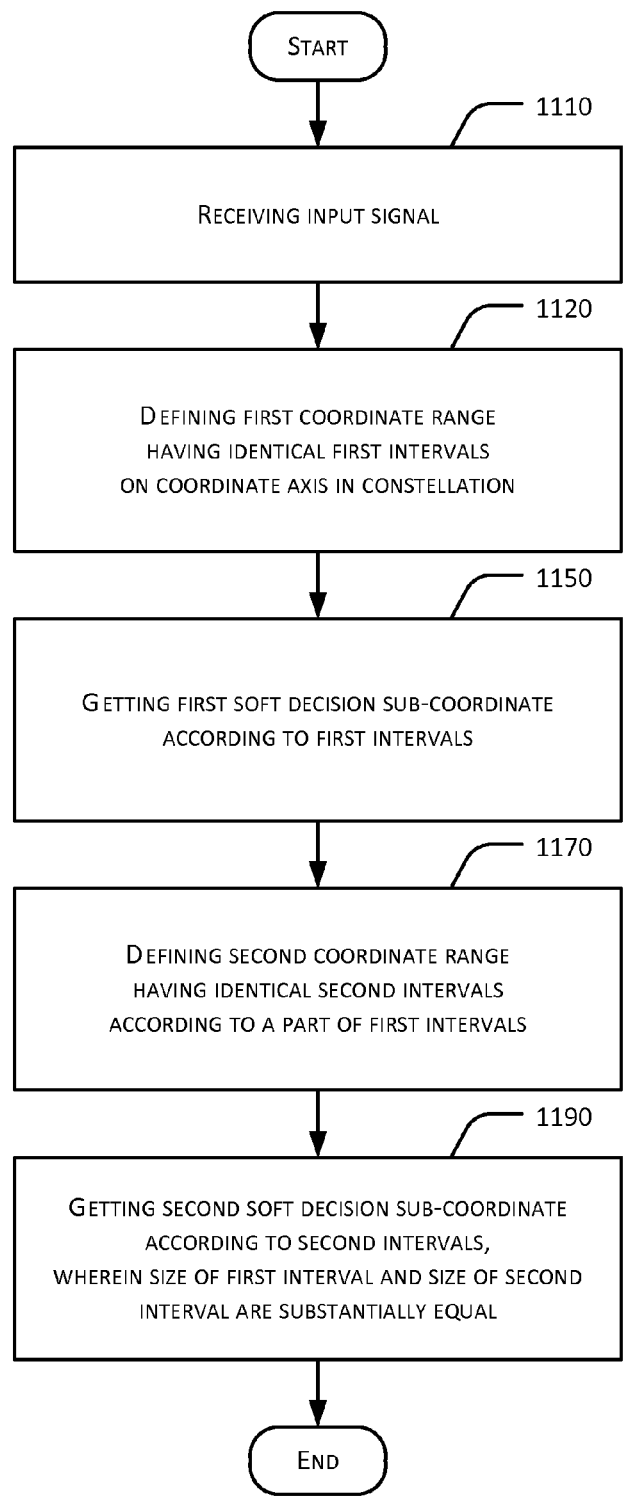
FIG. 11 is a flowchart of a soft decision method according to another embodiment of the present disclosure.

FIG. 11 is a flowchart of a soft decision method according to another embodiment of the present disclosure. In Step 1110, an input signal is received. In Step 1120, a first coordinate range having a plurality of equal first intervals is defined on a coordinate axis in a constellation. In Step 1150, a first soft decision sub-coordinate (such as $I_0$) is obtained according to the first intervals. In Step 1170, a second coordinate range having a plurality of equal second intervals is defined according to a portion of the first intervals. For example, the positive part of the first coordinate range (such as $I_0$), i.e. intervals from 1 to 4 from intervals 1 to 8, is defined as the second coordinate range such that the second coordinate range has four intervals with equal lengths. Consequently, the interval lengths of the first coordinate range and the second coordinate range are equal. Similarly, the negative part of the first coordinate range, i.e. intervals –1 to –4, can also be defined as the second coordinate range. In Step 1190, a second soft decision sub-coordinate (such as $I_1$) is obtained according to the second intervals. Further, the size of the first interval and the size of the second interval are substantially equal.

The embodiment can be applied to BPSK, QPSK or 16QAM. In an application to 64QAM, the above steps can be repeated. For example, FIG. 3 shows the coordinate value I=5.3, the two rightmost second intervals of the second coordinate range can be defined as the coordinate range of the $I_2$ coordinate, i.e. the range of the original intervals 4 to 8 on the I-axis, and $I_2=1$ can then be obtained from FIG. 3.

With the above description, when the coordinate value I=5.3, the optimal coordinate value is $(I_0^*, I_1^*, I_2^*)=(5.3, -1.3, 0.7)$. In the embodiment, $(I_0^*, I_1^*, I_2^*)=(5.3, -1.3, 0.7)$ is mapped to $(I_0, I_1, I_2)=(3, -1, 1)$. However, the prior art maps $(I_0^*, I_1^*, I_2^*)=(5.3, -1.3, 0.7)$ to $(I_0, I_1, I_2)=(3, -2, 2)$, which has larger errors compared to the embodiment, and such errors result in greater probabilities of misjudgment by the decoder. Therefore, the present disclosure provides a soft decision method and associated signal receiving system to improve the misjudgment of the signal receiving system on noise-interfered signals to increase coding gain and to reduce bit error rate.

While the present disclosure has been described in terms of what is presently considered to be the most practical and preferred embodiments, it is to be understood that the present disclosure needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A soft decision method for determining a soft decision coordinate associated with a constellation, the soft decision coordinate comprising a first soft decision sub-coordinate and a second soft decision sub-coordinate, the soft decision method comprising:
a signal retriever, for receiving an input signal comprising a coordinate value;
defining a first coordinate range on a coordinate axis in the constellation, the first coordinate range having a first limit and a second limit;
obtaining the first soft decision sub-coordinate according to the first coordinate range;
defining a second coordinate range on the coordinate axis in the constellation, the second coordinate range having a third limit and a fourth limit; and
obtaining the second soft decision sub-coordinate according to the second coordinate range,
wherein, the first limit and the third limit do not simultaneously equal to the second limit and the fourth limit, and
wherein the coordinate value has a fifth limit and a sixth limit, the first limit and the second limit are generated from multiplying a first coefficient by the fifth limit and the sixth limit respectively, and the third limit and the fourth limit are generated from multiplying a second coefficient by the fifth limit and the sixth limit respectively, wherein the second coefficient and the first coefficient are not equal.

2. The method according to claim 1, wherein the coordinate axis is an I-axis or a Q-axis on the constellation.

3. The method according to claim 1, wherein the method is applied to demapping of binary phase shift keying (BPSK), quadrature phase shift keying (QPSK), 16 quadrature amplitude modulation (16QAM) or 64QAM.

4. A signal receiving system, comprising:
a signal retriever that receives an input signal and transforms the received input signal to a coordinate value;
a demapper, coupled to the signal retriever, that demaps the coordinate value to a soft decision coordinate comprising a first soft decision sub-coordinate and a second soft decision sub-coordinate, the first soft decision sub-coordinate having a first limit and a second limit, the second soft decision sub-coordinate having a third limit and a fourth limit, wherein the first limit and the third limit do not simultaneously equal to the second limit and the fourth limit; and
a decoder, coupled to the demapper, that decodes the soft decision coordinate to output an output data,
wherein the demapper comprises:
a mapping function mapping apparatus, coupled to the signal retriever, comprising a first mapping function mapping unit and a second mapping function mapping unit that receive the coordinate value and map the coordinate value to a first coordinate and a second coordinate according to a mapping function and a first step and a second step respectively; and
a multiplier, coupled to the mapping function mapping apparatus, comprising a first multiplication unit and a second multiplication unit that multiply the first coordinate and the second coordinate by a first coefficient and a second coefficient, respectively, to obtain the first soft decision sub-coordinate and the second soft decision sub-coordinate respectively;
wherein the first step equals the second step, or the first coefficient and the second coefficient are not equal.

5. The system according to claim 4, wherein the mapping function mapping apparatus further comprises a quantizer, the quantizer comprising a first quantizing unit and a second quantizing unit, coupled to the first mapping function mapping unit and the second mapping function mapping unit respectively, that obtain the first coordinate and the second coordinate according to the first step and the second step respectively.

6. The system according to claim 4, wherein the coordinate axis is an I-axis or a Q-axis.

7. The system according to claim 4, wherein the demapper is applied to demapping of binary phase shift keying (BPSK), quadrature phase shift keying (QPSK), 16 quadrature amplitude modulation (16QAM) or 64QAM.

8. A signal receiving system, comprising:
a signal retriever that receives an input signal and transforms the received input signal to a coordinate value;
a demapper, coupled to the signal retriever, that demaps the coordinate value to a soft decision coordinate comprising a first soft decision sub-coordinate and a second soft decision sub-coordinate, the first soft decision sub-coordinate having a first limit and a second limit, the second soft decision sub-coordinate having a third limit and a fourth limit, wherein the first limit and the third limit do not simultaneously equal to the second limit and the fourth limit; and
a decoder, coupled to the demapper, that decodes the soft decision coordinate to output an output data,
wherein the demapper comprises:
   a mapping function mapping apparatus, coupled to the signal retriever, comprising a first mapping function mapping unit and a second mapping function mapping unit that receive the coordinate value and map the coordinate value to a first coordinate and a second coordinate, respectively, according to a mapping function;
   a multiplier, coupled to the mapping function mapping apparatus, comprising a first multiplication unit and a second multiplication unit that multiply the first coordinate and the second coordinate by a first coefficient and a second coefficient, respectively, to obtain a third coordinate and a fourth coordinate respectively; and
   a quantizer, coupled to the multiplier, comprising a first quantizing unit and a second quantizing unit that quantize the third coordinate and the fourth coordinate to the first soft decision sub-coordinate and the second soft decision sub-coordinate, respectively, according to a first step and a second step;
wherein, the first step equals the second step, or the first coefficient differs from the second coefficient.

9. The system according to claim 8, wherein the coordinate axis is an I-axis or a Q-axis.

10. The system according to claim 8, wherein the demapper is applied to demapping of binary phase shift keying (BPSK), quadrature phase shift keying (QPSK), 16 quadrature amplitude modulation (16QAM) or 64QAM.

* * * * *